N. W. SHIPP.
LAMP BRACKET.
APPLICATION FILED MAY 22, 1909.
937,875.
Patented Oct. 26, 1909.
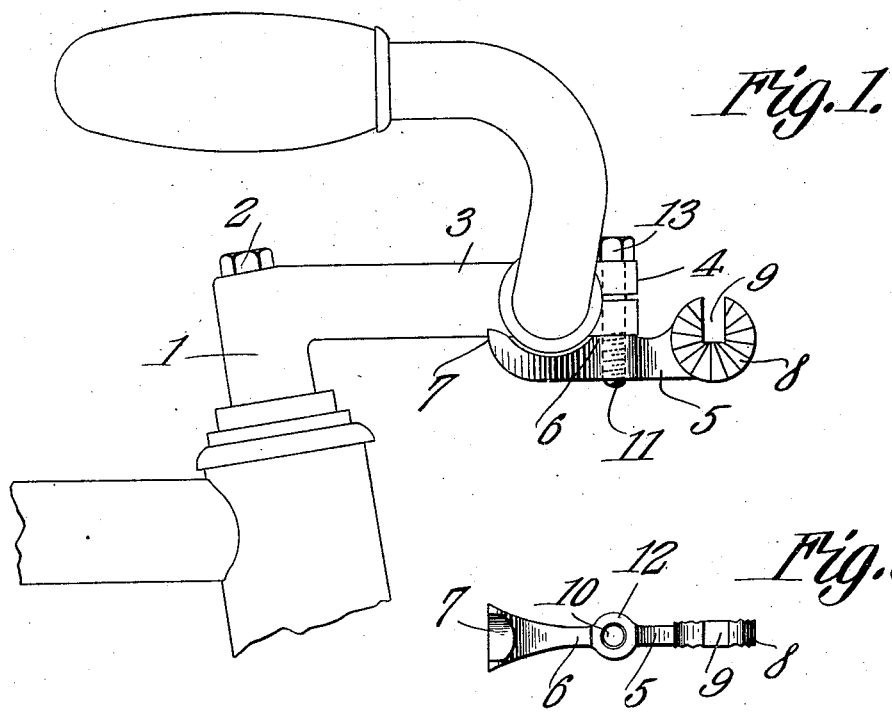
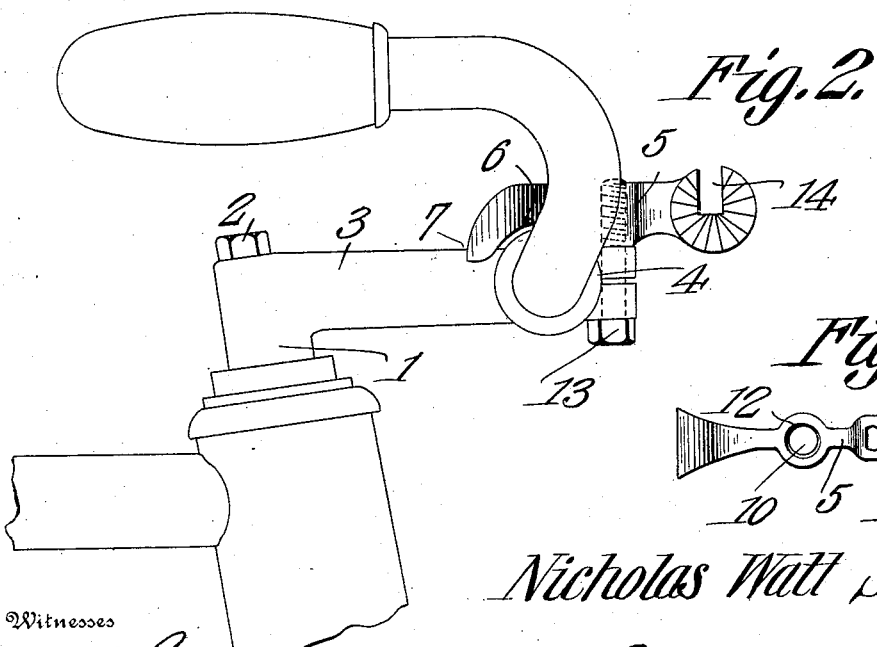
Witnesses
E. W. Stewart
Francis Boyle
Inventor
Nicholas Watt Shipp.
By C. A. Snow & Co.
Attorneys

UNITED STATES PATENT OFFICE.

NICHOLAS WATT SHIPP, OF SALEM, OREGON.

LAMP-BRACKET.

937,875.  Specification of Letters Patent.  Patented Oct. 26, 1909.

Application filed May 22, 1909. Serial No. 497,697.

*To all whom it may concern:*

Be it known that I, NICHOLAS WATT SHIPP, a citizen of the United States, residing at Salem, in the county of Marion and State of Oregon, have invented a new and useful Lamp-Bracket, of which the following is a specification.

My invention relates to lamp brackets, particularly bicycle lamp brackets, and has for its object to provide a means whereby the light may be instantly thrown in the direction the handle bars are turned.

Another object is to provide a device that is simple in construction, inconspicuous, and not liable to be damaged when the bicycle is placed against a tree or other support.

Still another object is to provide a device of the stated character, which cannot be jarred loose from its seat.

With these advantages and other objects in view, which will be shown in the accompanying specification, and set forth in the claims, my invention embraces the structure illustrated in the accompanying drawing wherein:—

Figure 1 is a side elevation, showing the bracket in applied position. Fig. 2 is a side elevation of a modified form of the bracket in applied position. Fig. 3 is a detail plan view of the bracket. Fig. 4 is a plan view of another modified form of the bracket.

In a more detailed description of my invention in which like characters of reference designate similar parts in the views shown, (1) is a bicycle handle bar post, of the usual construction, having the usual securing and adjusting nut, (2), and the usual extension bar, (3), terminating in the clamp (4) formed integrally therewith.

I make no claim to the type of steering head just described since the same is of the ordinary and well known construction. My invention resides instead in the means for holding a lamp to this steering head, the details of which will now be set forth. The lamp holding bracket consists essentially of an arm (5) having its upper surface (6) grooved transversely, to conform to the under surface of the clamp (4) and provided at one end with a groove (7) disposed axially of the arm (5) and adapted to conform to the under surface of the extension bar (3). The opposite end of said arm is provided with a circular head (8) disposed vertically, and serrated radially on its opposite faces. A groove (9) is cut into the head and extends to the center of the circular portion of the head.

At an intermediate point of the arm is an annular opening (10), screw threaded and adapted to engage the end of the securing and clamping bolt (11). This bolt has one end screw threaded to engage in the threads (12) of the annular opening (10) and the opposite end terminates in a square head (13).

As can be readily seen by referring to Fig. 1, the securing bracket performs the function of a nut for engaging the threaded end of said securing and clamping bolt, and the one operation of screwing home said bolt, simultaneously locks the handle bars and secures the bracket in operative position. By this means all the parts are securely locked together, which prevents any rattling that might otherwise occur, due to the vibration of the bicycle.

It is sometimes desired to have the under side of the extension bar free to enable the rider to carry a bundle or package strapped to the under side of the handle bar. To provide for an action of this kind a modified form of bracket is shown in Fig. 2. It is substantially the same in construction as above shown with the exception that the slot (14) is reversed in position. The bracket can now be secured to the upper side of the handle bar extension. To do this, it is only necessary to place the clamp on the upper side of said extension, insert the clamp bolt through the bottom hole in the clamp and screw the bolt home.

On some bicycle lamps the securing head is in the form of a tongue. To engage and secure a head of this kind, a modified form of my bracket is shown in Fig. 4. In this case the securing end of the bracket is a head terminating in two parallel plates, formed integrally therewith, said plates being substantially circular in marginal contour and disposed vertically, one on either side of the longitudinal axis of the arm, said plates having the grooves (16) and (17) cut in the center substantially as described above.

Having thus described my invention, what I claim as new is:—

1. The combination with an extension handle bar, having a clamp formed integral therewith, of a lamp holding arm fitted to the said handle bar and secured by said clamp, the free end of the arm being constructed to hold a lamp.

2. The combination with a bicycle handle bar extension and clamp, of a lamp holding bracket, said bracket adapted to conform to the surface of the clamp and extension bar of said bicycle handle bar, one end of said arm having a grooved head for adjustably securing a lamp thereon, said arm having a means for simultaneously clamping the handle bar and said arm in position.

3. The combination with a bicycle handle bar extension and clamp, of a lamp holding bracket, said bracket being grooved transversely to conform to the surface of the clamp of said handle bar, and longitudinally to conform to the side of the extension bar of said handle bar, said arm having at one end a serrated, grooved head, vertically disposed, for adjustably securing a lamp thereon, said arm having a screw threaded annular opening, adapted to seat a clamping bolt for simultaneously clamping the handle bar, and securing said arm to said handle bar extension.

In testimony that I claim the foregoing as my own, I have hereto affixed my signature in the presence of two witnesses.

NICHOLAS WATT SHIPP.

Witnesses:
C. L. McNary,
Nettie J. Miller.